United States Patent Office 3,277,788
Patented Oct. 11, 1966

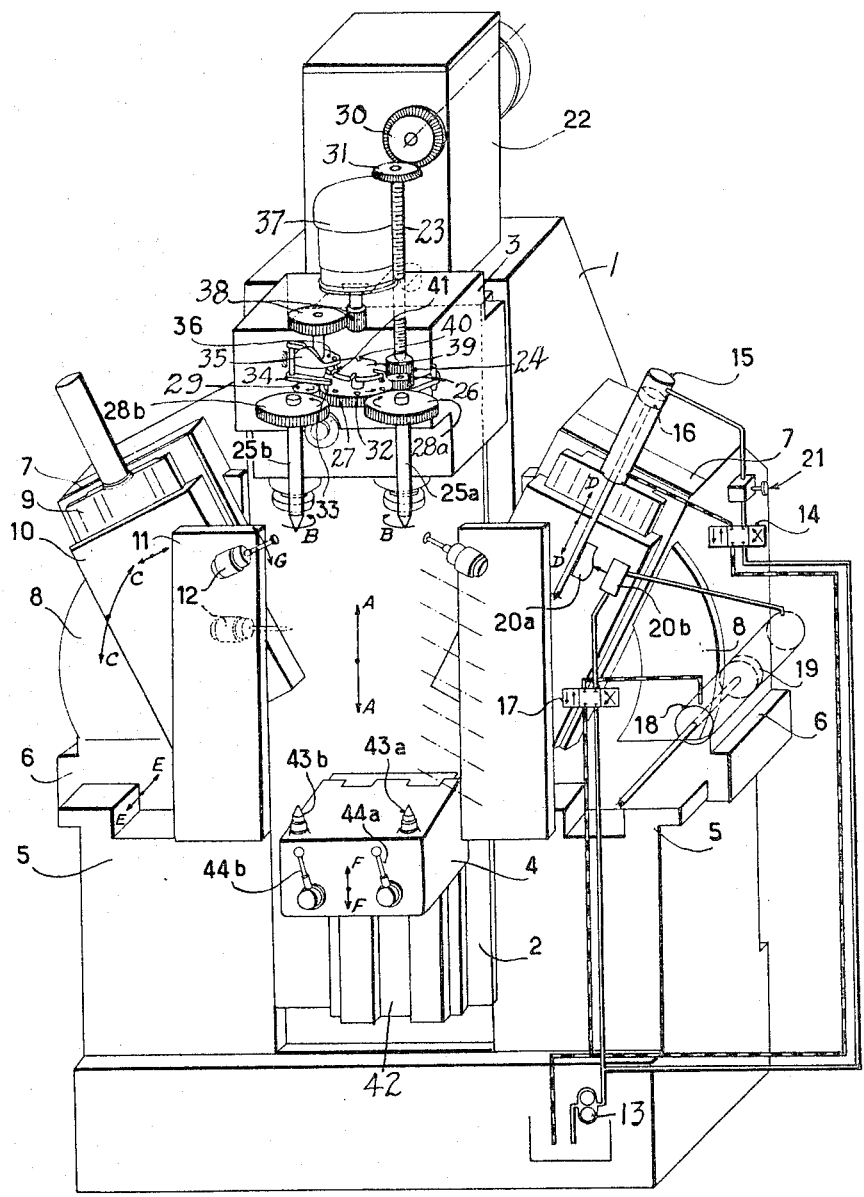

3,277,788
MACHINE-TOOL FOR FORMING GROOVES
Pierre Portal, Haute Marne, and André Trieule, Neuilly-sur-Seine, France, assignors to Commissariat a l'Energie Atomique, Paris, France
Filed Nov. 3, 1964, Ser. No. 408,553
Claims priority, application France Nov. 19, 1963, 954,185
5 Claims. (Cl. 90—11.48)

The present invention has for an object an improved machine-tool allowing adjacent grooves to be cut into parts under manufacture, the slope or inclination of the grooves, where these are rectilinear, or the spacing of the grooves where these are helical, being variable as desired.

Hollow metal members from the interior of which exothermic materials flow, are frequently fitted with cooling flanges. In one particular case in industry, tubes of regular cylindrical or prismatic shape, fitted with cooling flanges, are used as sheaths for fuel elements for nuclear reactors. Such sheaths have a considerable number of flanges, the manufacture of which, by means of known milling-machines, is quite slow, because these machines do not generally incorporate more than two operating tools. Vertical or horizontal milling-machines for forming grooves or rectilinear throats in cylindrical members are already known. Screw-cutting lathes for forming helical grooves in working parts are also known. Such machine-tools, however, cannot be used for optionally forming both rectilinear and helical grooves.

The present invention therefore has for a further object an improved machine-tool for forming either rectilinear or helical grooves the slope or inclination of rectilinear grooves or the spacing of the helical grooves being variable.

To this end, a machine-tool according to the invention is constituted by the combination of a screw-cutting lathe and a universal milling-machine.

The machine-tool, according to the invention, is essentially constituted by a fixed main frame, fitted with a vertical work table, which is movable in a vertical direction, comprising a fixed head stock and a tail-stock, and with at least one auxiliary frame movable in a direction perpendicular to the plan of the work table and arranged on lateral slide bars of the main frame, at least one rectangular, orientable table, movable in a vertical plane about an axis and on an annular slide-bar, both secured to said auxiliary frame, at least one pin-bearing carriage, movable in a vertical plane, and guided by a longitudinal slide-bar secured to said at least one orientable table, at least one vertical pin-bearing plate secured to the carriage by means of a pivot, and one or more power-driven pins of the milling cutters, pins being arranged on the plate and orientable in a vertical plane.

According to another feature, the movement of the work table is controlled by a motor secured to the main frame by means of an endless screw acting on the fixed head-stock, the rotation of the said screw also being transmissible to the part-bearing pin or pins of the fixed head-stock by means of a disconnectable pinion.

According to another feature, the fixed head-stock comprises a locking mechanism of the part-bearing pins preventing their rotation.

According to another feature, the fixed head-stock is fitted with a movement-dividing mechanism, which, after the part-bearing pin has rotated by a certain angle, automatically stops its rotation.

According to another feature, the carriage is fitted with a reproducing device, determining the lateral movement of the movable frame in dependence upon the advance of the carriage.

In order that the invention may be more clearly understood, reference will now be made to the accompanying drawings which show one embodiment thereof by way of example, and in diagrammatic form in perspective, together with hydraulic controlling circuits for the movable frame and the tool-bearing carriage.

Referring now specifically to the drawings, a vertical work table 2 comprising a fixed head-stock 3 and a tail-stock 4 is arranged on the central part of a fixed frame 1, said table 2 being slidable in a vertical plane determined by the frontal face of the fixed frame 1.

The fixed frame 1 comprises two identical lateral shoulders 5, each of which constitutes slide-bars for a movable auxiliary frame 6 which may move in a horizontal plane perpendicular to that of the work table 2.

On said movable frame 6 is arranged a rectangular, orientable table 7, movable in a vertical plane about an axis (not shown on the diagram) and guided by an annular slide-bar 8, both being secured to the auxiliary frame 6.

A rectilinear slide-bar 9 secured on the orientable table 7 in such a way that its guiding direction is parallel to the longest face of the table 7, is used to guide a carriage 10, known as tool-bearing or pin-bearing carriage, on which is fixed by means of a pivot (not shown on the diagram), a vertical, pin-bearing plate 11 which always rests in a vertical position whatever may be the inclination of the table 7 and of the carriage 10 with respect to the horizontal.

The plate 10 constitutes the support of a plurality of milling cutter bearing pins 12, orientable in a vertical plane parallel to that of the plate 10. The pins 12 are all arranged in the same plane, one beneath the other, and the inclination of their axes is adjustable only in said plane. The axes of the pins 12 are always parallel, and their inclination depends only upon the angular position of the orientable table 7. Inasmuch as the adjusting mechanism for the inclination of the pins 12 is not part of the invention, said latter is neither shown on the diagram nor explained in the description.

The movement of the carriage 10 and of the auxiliary frame 6 is controlled by means of a hydraulic circuit comprising a gear-pump 13, an electro-valve 14 controlling the admission and the escape of the fluid in and out of a control cylinder 15 fitted with a double-acting piston 16 for the movement of the carriage 10, an electro-valve 17 controlling the admission and escape of the fluid in and out of a control cylinder 18 fitted with a double-acting piston 19 for moving the movable frame 6 and a reproducing device 20a, 20b (template 20a, automatic regulator 20b), regulating the advance of the movable frame 6 in dependence upon the movement of the carriage 10. A manual regulator 21 for the outflow of fluid may be interposed in the hydraulic circuit between the electro-valve 14 and the upper end of the cylinder 15. The rotation and the locking of the orientable table 7 are ensured by any mechanism housed in or on the movable frame 6.

The movement of the work table 2 is controlled by a motor 22 secured to the fixed framework 1 and by means of a continuous screw 23 co-operating with a thread on the fixed head-stock 3. At its lower end, the screw 23 comprises a control pinion 24 co-operating with a transmission mechanism actuating a rotating movement to the part-bearing pin or pins 25a, 25b.

When the fixed head-stock 3 is fitted with two part-bearing pins 25a, 25b, the transmission mechanism comprises a disconnecting pinion 26, which may be put into gear simultaneously with the control pinion 24 and with a central toothed wheel 27 which co-operates directly, on the one hand, with a toothed wheel 28a, integral with the part-bearing pin 25a and, on the other hand, by means of a reversing pinion 29 with a toothed wheel 28b integral with the pin 25b.

It is obvious that the speed of rotation of the motor 22 is geared down before the rotation is transmitted to the screw 23 by means of a conical gear 30, 31. The gearing-down mechanism may be disconnected in order to allow a quicker movement of the work table 2. A continuous speed regulator is also provided, allowing any speed of rotation of the pins 25a, 25b, and translation of the table 2, to be obtained.

The central toothed wheel 27 of the transmission mechanism may be locked. For this purpose, the central wheel 27 comprises near its periphery a certain number of bores 32 spaced at equal intervals. A locking lug 33, movable in a plane which is perpendicular to that of the toothed wheel 27 and fixed on a locking arm 34, co-operates with a locking cam 35 integral with a disc 36, the rotation of which is controlled by a head-stock motor 37 by means of a gear 38.

The part-bearing pins 25a, 25b, may also be driven in intermittent rotation by the head-stock motor 37. For this purpose, the central wheel 37 is temporarily fitted with a removable Maltese cross 39 comprising a number of notches 40, corresponding to the number of bores 32 of the central wheel 27. A driving lug 41 integral with the disc 36 may be arranged in one of said notches 40 and thus drive the Maltese cross 39 and the transmission mechanism 27, 28a, 28b, 29 (the pinion 26 being disconnected) as long as it is in contact with the notch 40. During this time, the movable lug 33 is lifted by the cam 35 which allows it to connect into the bore 32 only during the time when the arm 34 is not lifted by the cam 35. The position of the cam 35 with respect to the lug 41, both secured to the disc 36, is such that the locking lug 33 is unclamped by the cam 35 just before the driving lug 41 returns into the following notch 40 of the Maltese cross 39. In this way, the Maltese cross 39 in co-operation with the disc 36 and the toothed wheel 27 serves as a dividing mechanism for the rotating movement of the part-bearing pins 25a, 25b.

The movable head-stock 4 is guided by slide-bars 42 and comprises in alignment with each part-bearing pin 25a, 25b, a locking loose-head 43a, 43b controlled by means of a locking lever 44a, 44b.

The machine-tool according to the invention allows the following operation to be carried out:

(a) Rectilinear movement of the work table 2 in a vertical plane indicated by the arrow A;

(b) Rotation of the part-bearing pins 25a, 25b along arrows B, the pin 25a turning in a direction opposite to that of the pin 25b;

(c) Pivoting of the orientable table 7 as well as of the carriage 10 in a vertical plane, along the arrow C;

(d) Rectilinear movement of the carriage 10 in a vertical plane, along the arrow D;

(e) Rectilinear movement of the auxiliary frame 6 in a horizontal plane, along arrow E;

(f) Rectilinear movement of the tail-stock 4 with respect to the work table 2 in a vertical plane, along the arrow F; and (g) Pivoting of the tool-bearing pins 12 in a vertical plane, along the arrow G.

In order better to understand the technical advantages possessed by a machine-tool according to the invention several embodiments thereof for machining rectilinear or spiral grooves will now be described.

(1) Machining of rectilinear grooves in a cylinder, the grooves being parallel to the axis of the cylinder and spaced at equal distances on the periphery of the said cylinder:

Having fixed the parts to be machined on the work table 2, between the fixed head-stock 3 and the tail-stock 4, the carriage 10 is put into a horizontal position (indicated by the dotted lines on the left of the diagram) by causing the orientable table 7 to pivot. The milling-cutter bearing pins 12 then automatically take a horizontal position (indicated by dotted lines). The milling-cutters used are saw-cutters, which are put into contact with the part to be machined by a rapid advance of the movable frame 6. Then the milling-cutters are turned and at the same time the movable frame 6 is slowly advanced (work-advance), until the depth of passage desired is obtained on the part to be machined. Now, the movement of the movable frame 6 is stopped and the frame is then fixed in this position. The work table 2 is made to descend slowly, by turning the continuous screw 23. When the pinion is disconnected, the part to be machined effects only a movement in translation. Of course, the toothed wheel 27 has been previously locked. When a complete groove is formed in the part, all the movements are stopped (movement of the table 2 and rotation of the milling-cutters) and the cutters are released by moving back the movable frame 6. Then the part to be machined is turned through a desired angle by means of the head-stock motor 37 and the movement dividing mechanism 36, 38, 40, 48, the table 2 is raised again and the same cycle can be recommenced.

(2) Machining of the rectilinear flanges defined by closely adjacent grooves which have a rectilinear base, by utilising saw-cutters:

Having suitably fixed the part to be machined on the work table 2, the pins 25a, 25b and the table 2 are locked, the pinion 26 being disconnected. The carriage 10 and the bearing pins 12 are then moved in such a way that a movement of the carriage 10 is made in the direction of the desired inclination of the grooves and the pitch of the flanges with respect to the axis of the part to be machined, and so that the axes of the pinions 12 are perpendicular to said direction. The maximum depth of the passage is determined by an appropriate movement of the movable frame 6. Then carriage 10 is rapidly advanced in the direction of the arrow D until the saw-cutters come into contact with the part to be machined. The rotation of the cutters and the work-advance of the carriage 10 is then adjusted. When the carriage 10 has finished its travel, the movable frame 6 is moved back, in order to disconnect the cutters from the part to be machined, then the carriage 10 is quickly moved back. Now the advance of the work table 2 is adjusted by one flange step by means of the screw 23 and the following cycle is commenced. After all the flanges of a sector of the part have been machined, a sector on said latter is turned (indexing) by means of the dividing mechanism 36, 37, 38, 40, 41 and the machining of a new face of the part is started.

(3) Machining of rectilinear flanges defined by adjacent grooves close to one another and with an elliptical base, by using saw-cutters:

This method of operation is almost identical to that described under (2) above. The only difference between the two methods of operation consists in the fact that the work-advance of the carriage 10 is accompanied by a combined movement of the movable frame 6, the reproducing device 20a, 20b controlling the movement of the movable frame 6 in dependence upon the advance of the carriage 10. Of course, the base of the machined groove may have another form such as that of an ellipse. For that it is necessary to use another template 20c of a suitable shape.

(4) Machining of flanges and spiral grooves by using torpedo-cutters:

The carriage 10 and the cutter-bearing pins are placed in the horizontal position as is shown in dotted lines on the left-side of the drawing. The movable frame 6 is moved until the vertical plane defined by the axes of the cutter-bearing pins 12 passes through the axis of the part to be machined. Having locked the frame 6 in this position, the carriage 10 is rapidly advanced until the torpedo-cutters come into contact with the parts to be machined, and the pins 25a, 25b are again locked, together with the work table 2. The cutters are turned and the carriage 10, the movement of which is stopped when the desired depth of passage is achieved, is slowly advanced. Then the pins 25a, 25b and the table 2 are released, and the pinion 26 is engaged and the motor 22 is turned so that the table 2 moves while the pins 25a, 25b turn. Any point located on the periphery of the part to be machined then describes a helix, the pitch of which depends on the speed of rotation of the pins or of the speed of translation of the table 2. When the travel of the table 2 has finished, the cutters are disengaged by moving back the carriage 10. The table 2 and the parts to be machined are returned to their initial positions, when the continuous screw 23 is turned in the opposite direction. Then the table 2 is advanced by one flange step, the pinion 26 being disconnected during this movement. Then the following cycle is commenced.

Of course, the embodiment of the machine-tool hereinabove described and shown in the drawing has been given only by way of example. Various modifications may be made to the specific details referred to without departing from the scope of the invention as defined by the appended claims.

We claim:

1. A machine-tool for forming adjustably inclinable rectilinear grooves and adjustably pitched helical grooves in workpieces, to form flanges defined by any two such adjacent grooves, said machine-tool comprising in combination, a screw-cutting blade and a universal milling machine having milling-cutters thereon, and constituted by a main fixed frame, lateral guide-bars on said main frame, a vertical work table fitted to said main fixed frame, means for moving said work table in a vertical direction, said table comprising a fixed head-stock and a movable tail-stock located thereon, at least one auxiliary frame, means for moving said auxiliary frame in a direction perpendicular to the plane of the said work table, said auxiliary frame being arranged on said lateral guide-bars on said main frame, at least one orientable rectangular table, movable in a vertical plane about an axis and on an annular guide-bar, said axis and said guide-bar being integral with said auxiliary frame, at least one pin-bearing carriage movable in a vertical plane and guided by a longitudinal guide-bar integral with said orientable table by at least one vertical bearing plate, secured to said carriage by means of a pivot, and at least one power driven pin for said milling cutters, pins being arranged on said plate and orientable in a vertical plane.

2. A machine-tool according to claim 1, and comprising further, a motor secured to said main frame by means of a continuous screw acting on said fixed head-stock, for moving said work table, and a disconnectable pinion for transmitting the rotation of said screw to one or more part-bearing pins on said fixed head-stock.

3. A machine-tool according to claim 2, wherein said fixed head-stock comprises a mechanism for locating said part-bearing pins, preventing their rotation.

4. A machine-tool according to claim 2, wherein said fixed head-stock is fitted with a movement-dividing mechanism for automatically stopping the rotation of said part-bearing pin after it has rotated through a predetermined angle.

5. A machine-tool according to claim 1, comprising further, a reproducing device for determining the lateral movement of said movable frame in dependence upon the advance of said carriage, said reproducing device being fitted to said pin-bearing carriage.

No references cited.

WILLIAM W. DYER, JR., *Primary Examiner.*

G. A. DOST, *Assistant Examiner.*